(12) United States Patent
Cabral, Jr. et al.

(10) Patent No.: US 8,212,218 B2
(45) Date of Patent: Jul. 3, 2012

(54) DOSIMETER POWERED BY PASSIVE RF ABSORPTION

(75) Inventors: Cyril Cabral, Jr., Yorktown Heights, NY (US); Michael S. Gordon, Yorktown Heights, NY (US); Steven J. Koester, Yorktown Heights, NY (US); Conal E. Murray, Yorktown Heights, NY (US); Kenneth P. Rodbell, Yorktown Heights, NY (US); Stephen M. Rossnagel, Yorktown Heights, NY (US); Robert L. Wisnieff, Yorktown Heights, NY (US); Jeng-bang Yau, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 12/627,076

(22) Filed: Nov. 30, 2009

(65) Prior Publication Data

US 2011/0127438 A1    Jun. 2, 2011

(51) Int. Cl.
    *G01T 1/02* (2006.01)
(52) U.S. Cl. ............. 250/370.07; 250/391; 250/390.03; 250/371
(58) Field of Classification Search ............. 250/370.07, 250/391, 390.03, 371, 370.02
    See application file for complete search history.

(56) References Cited

U.S. PATENT DOCUMENTS

| | | | |
|---|---|---|---|
| 3,450,884 A * | 6/1969 | Gourlet et al. | 250/214 R |
| 4,672,309 A * | 6/1987 | Gandhi | 324/95 |
| 4,788,126 A | 11/1988 | Feldman et al. | |
| 4,788,581 A * | 11/1988 | Knoll et al. | 257/428 |
| 5,233,990 A | 8/1993 | Barnea | |
| 5,528,651 A | 6/1996 | Leksell et al. | |
| 5,661,310 A | 8/1997 | Jones | |
| 6,097,263 A * | 8/2000 | Mueller et al. | 333/17.1 |
| 6,171,252 B1 * | 1/2001 | Roberts | 600/485 |
| 6,429,444 B1 | 8/2002 | Korenev et al. | |
| 6,939,299 B1 * | 9/2005 | Petersen et al. | 600/398 |
| 7,375,347 B2 * | 5/2008 | Colvin et al. | 250/459.1 |

(Continued)

FOREIGN PATENT DOCUMENTS

WO    WO00/40299 A1    7/2000

OTHER PUBLICATIONS

Scarantino et al., An Implantable Radiation Dosimeter for Use in External Beam Radiation Therapy, Medical Physics, Sep. 2004, pp. 2658-2671, vol. 31, No. 9, American Association of Physicists in Medicine.

(Continued)

*Primary Examiner* — David Porta
*Assistant Examiner* — Djura Malevic
(74) *Attorney, Agent, or Firm* — Cantor Colburn LLP; Vazken Alexanian

(57) ABSTRACT

A system for determining an amount of radiation includes a dosimeter configured to receive the amount of radiation, the dosimeter comprising a circuit having a resonant frequency, such that the resonant frequency of the circuit changes according to the amount of radiation received by the dosimeter, the dosimeter further configured to absorb RF energy at the resonant frequency of the circuit; a radio frequency (RF) transmitter configured to transmit the RF energy at the resonant frequency to the dosimeter; and a receiver configured to determine the resonant frequency of the dosimeter based on the absorbed RF energy, wherein the amount of radiation is determined based on the resonant frequency.

20 Claims, 7 Drawing Sheets

U.S. PATENT DOCUMENTS

| | | | |
|---|---|---|---|
| 7,900,518 B2* | 3/2011 | Tai et al. | 73/754 |
| 7,935,935 B2* | 5/2011 | Roberts et al. | 250/393 |
| 2004/0095288 A1* | 5/2004 | Jackson | 343/853 |
| 2004/0212457 A1* | 10/2004 | Eden et al. | 333/185 |
| 2006/0234670 A1* | 10/2006 | Blaker et al. | 455/343.1 |
| 2007/0106151 A1* | 5/2007 | Scheuermann | 600/424 |
| 2008/0224922 A1* | 9/2008 | Cleland et al. | 342/175 |
| 2010/0019351 A1* | 1/2010 | Ratnakumar et al. | 257/595 |
| 2010/0096556 A1 | 4/2010 | Arsalan et al. | |
| 2010/0219494 A1* | 9/2010 | Barnaby | 257/429 |
| 2010/0256481 A1* | 10/2010 | Mareci et al. | 600/423 |

OTHER PUBLICATIONS

Son, et al., "An Implantable Wireless Microdosimeter for Radiation Oncology", School of Electrical and Computer Engineering, Purdue University, W. Lafayette, IN., USA; copyright 2008 IEEE; MEMS 2008, Tucson, AZ, USA, Jan. 13-17, 2008; pp. 256-259.

PCT—"Notification of Transmittal of the International Search Report and the Written Opinion of the International Searching Authority, or the Declaration"; International Application No. PCT/EP2010/068435; Date of Mailing Jun. 15, 2011; pp. 1-10.

* cited by examiner

DOSIMETER POWERED BY PASSIVE RF ABSORPTION

FIELD

This disclosure relates generally to the field of radiation dosimetry.

DESCRIPTION OF RELATED ART

During medical radiation treatments for tumors and the like, it is important to precisely measure the amount and location of a dosage of radiation at the tumor to determine the impact to the tumor while minimizing damage to nearby non-cancerous tissues. The tumor may be located using x-ray technology, such as planar x-rays or a CT (computerized tomography) scan, and then radiation in the form of a beam of energetic protons, or other energetic particles or particle-like entities such as neutrons, alphas, heavy ions, gamma rays, or x-rays, is aimed from outside the body to the approximated tumor location. A surface dosimeter or ionization counter may be placed outside the body in line with the proton beam. However, the spatial tolerance of a surface dosimeter is generally poor, as a surface dosimeter may only determine the amount of radiation that goes into the body or the dose delivered to the tumor, not the location or depth of the radiation's impact inside the body. Implantable dosimeters exist, but they may be relatively large, such that they must be removed from the body after a radiation treatment.

SUMMARY

In one aspect, a method for determining an amount of radiation includes receiving the amount of radiation by a dosimeter, the dosimeter comprising a circuit, the circuit having a resonant frequency that is configured to change according to the amount of radiation received by the dosimeter; absorbing radiofrequency (RF) energy by the dosimeter at the resonant frequency of the circuit from an RF transmitter; determining the resonant frequency of the circuit based on the absorbed RF energy; and determining the amount of radiation based on the determined resonant frequency.

In one aspect, a system for determining an amount of radiation includes a dosimeter configured to receive the amount of radiation, the dosimeter comprising a circuit having a resonant frequency, such that the resonant frequency of the circuit changes according to the amount of radiation received by the dosimeter, the dosimeter further configured to absorb RF energy at the resonant frequency of the circuit; a radiofrequency (RF) transmitter configured to transmit the RF energy at the resonant frequency to the dosimeter; and a receiver configured to determine the resonant frequency of the dosimeter based on the absorbed RF energy, wherein the amount of radiation is determined based on the resonant frequency.

In one aspect, a device for determining an amount of radiation includes a circuit, the circuit having a resonant frequency, the circuit comprising a capacitor, wherein the capacitor is configured to receive an amount of radiation, wherein a capacitance of the capacitor changes based on the amount of radiation, and the resonant frequency changes according to the capacitance; an inductor; and an antenna configured to absorb radiofrequency (RF) energy at the resonant frequency, such that the amount of radiation is determined based on the absorbed RF energy.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for a dosimeter powered by passive RF absorption are provided, with exemplary embodiments being discussed below in detail. Because the dosimeter is powered by passive RF absorption, it does not require a connected power source, allowing the passive dosimeter to be made relatively small. The RF transmitting and receiving electronics are located external to the body. The passive dosimeter may be inserted in the body by any appropriate method including but not limited to a needle injection; it does not need to be removed from the body after usage and may be reused for multiple radiation treatments. Some embodiments of a passive dosimeter may be biodegradable. The passive dosimeter may also be fabricated relatively cheaply. Multiple dosimeters may be placed around a tumor to provide spatial dosage information.

The passive dosimeter comprises an LC circuit, comprising a radiation-sensitive varactor (or similar charge-sensitive device), an inductor, and an antenna that absorbs energy from an external RF field. The RF energy is absorbed by the antenna at the circuit's resonant frequency. The varactor's (or similar device's) capacitance decreases as radiation is received by the varactor, and the LC circuit's resonant frequency changes according to the decrease in capacitance in the varactor. Determination of the resonant frequency of the LC circuit allows for determination of the amount of radiation received by the varactor.

Figure 1:
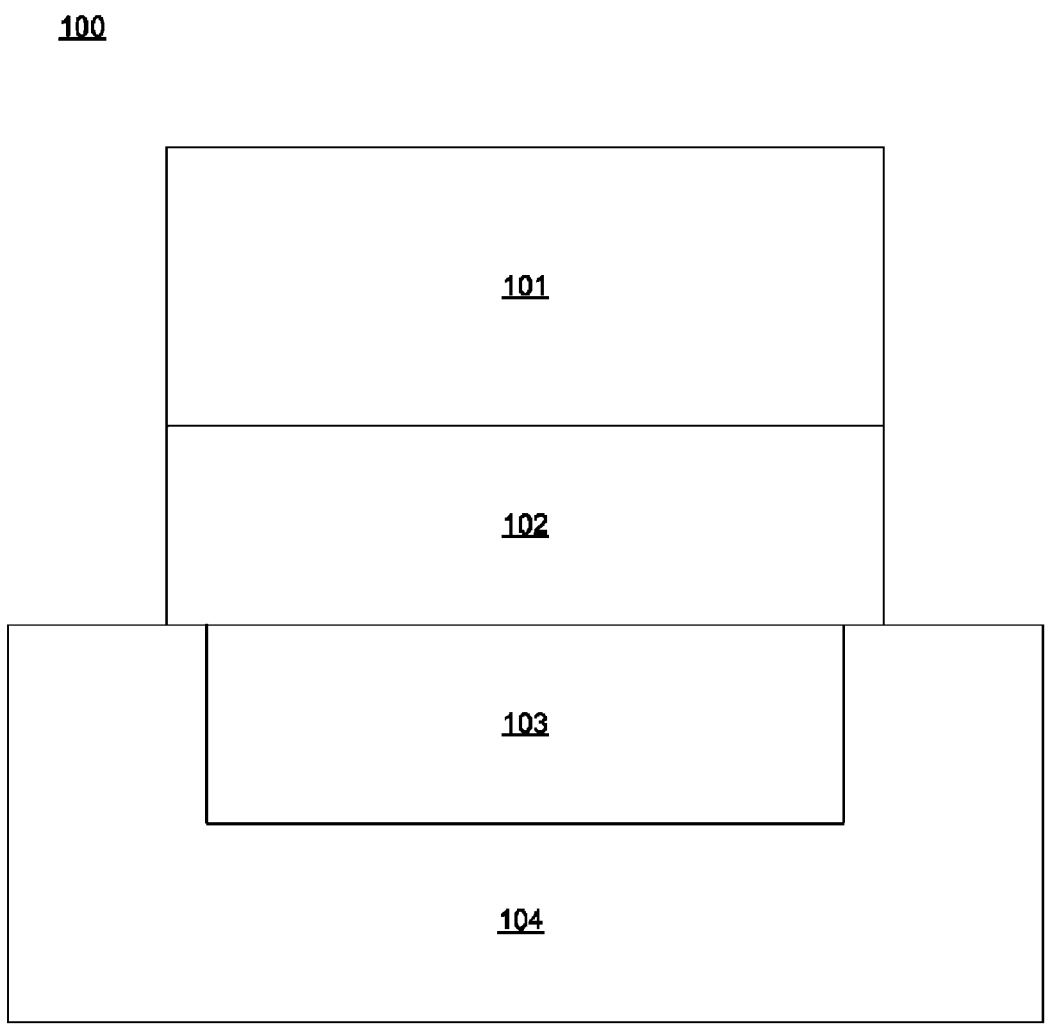
FIG. 1 illustrates an embodiment of a varactor that may be used as a dosimeter powered by passive radiofrequency (RF) absorption.

The varactor may comprise a metal-oxide-semiconductor (MOS) capacitor. FIG. 1 illustrates an embodiment of a varactor 100. Gate electrode 101 comprises metal or polysilicon, and may be about 1000 angstroms thick or smaller. Gate oxide 102 may comprise $SiO_2$, and is located on top of a substrate comprising lightly doped or undoped silicon region 103 and heavily doped silicon region 104. Silicon regions 103 and 104 may comprise either n-type or p-type doped silicon. The substrate may optionally be connected to a substrate contact or to self-aligned diffusion regions at the periphery of the capacitor, or both. Varactor 100 is at or near flat-band, having a relatively high capacitance. As radiation is received by varactor 100, negative charge is trapped in gate oxide 102, as is illustrated below with regards to FIG. 2.

Figure 2:
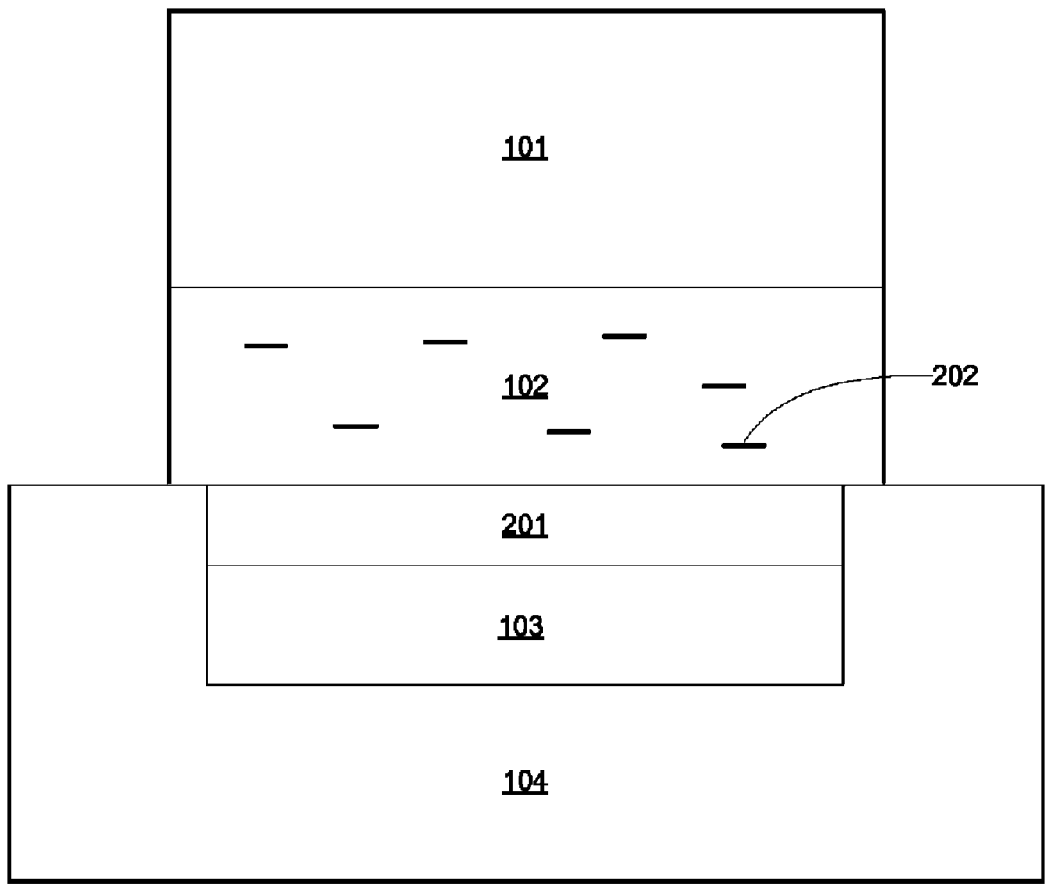
FIG. 2 illustrates an embodiment of a varactor that may be used as a dosimeter powered by passive RF absorption after absorption of radiation.

FIG. 2 illustrates an embodiment of a varactor 200 after receiving an amount of radiation. Radiation comprising incident protons, x-rays, gamma rays, neutrons, ions or alphas causes a negative charge (e.g., negative charge 202) to be trapped in gate oxide 102. Lightly doped or undoped silicon silicon region 103 becomes depleted according to the amount of negative charge trapped in gate oxide 102, forming depletion region 201, which grows as more radiation is received by varactor 200 and the amount of negative charge in gate oxide 102 increases. The capacitance of varactor 200 is reduced according to the size of depletion region 201.

Figure 3:
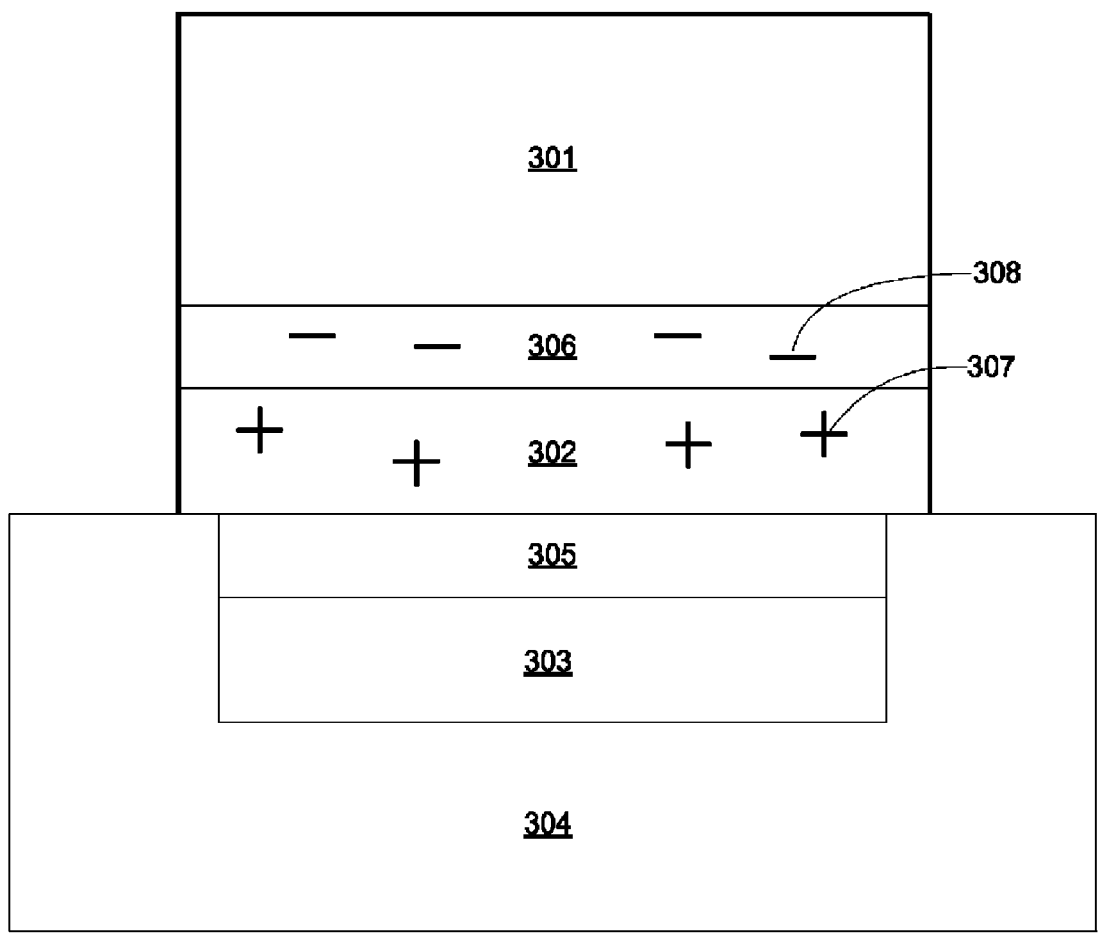
FIG. 3 illustrates an embodiment of a varactor that may be used as a dosimeter powered by passive RF absorption.

FIG. 3 illustrates an embodiment of a varactor 300 comprising an additional dielectric layer 306. Dielectric 306 is located in between dielectric 302 and gate electrode 301. Depletion region 305 is formed in doped silicon 304 by negative charge (e.g., negative charge 308) trapped in dielectric 306 and positive charge (e.g., positive charge 307) trapped in dielectric 302. Dielectric 302 may comprise $SiO_2$, and dielectric 306 may comprise $SiNx$. The conduction band difference between dielectric 302 and dielectric 306 allows holes to be trapped near the interface between dielectric 302 and depletion region 305. Depletion region 305 grows according to the amount of charge trapped in dielectric 305 and dielectric 306, and the capacitance of varactor 300 is reduced as depletion region 305 grows.

Figure 4:
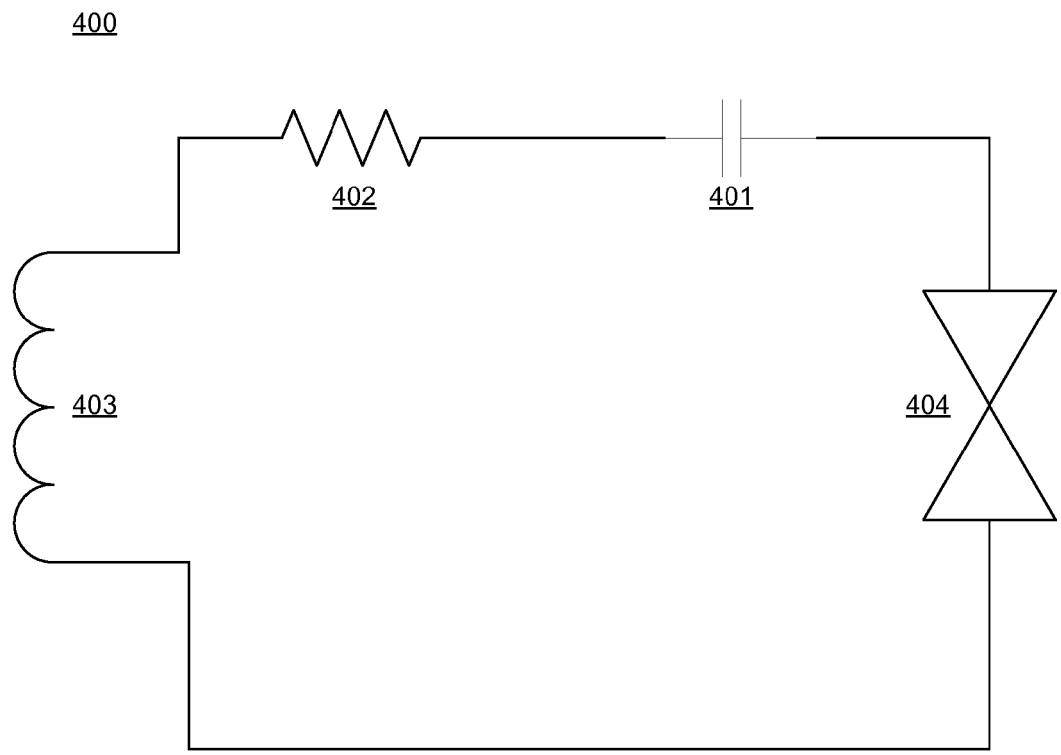
FIG. 4 illustrates an embodiment of a dosimeter powered by passive RF absorption comprising an LC circuit.

FIG. 4 illustrates an embodiment of a passive dosimeter 400 comprising an LC circuit. Dosimeter 400 comprises an LC circuit including capacitor 401, resistor 402, inductor 403, and antenna 404. A varactor, which may comprise but is not limited to any of the varactors shown in FIGS. 1-3, comprises resistor 402 and capacitor 401; with reference to FIGS. 1 and 2, gate electrode 101 is connected through inductor 403 and antenna 404 to the backside of doped silicon 104 to form dosimeter 400. The capacitance of capacitor 401 varies with the size of depletion region 201, changing the resonant frequency of the dosimeter 400.

Further embodiments of a passive dosimeter may comprise multiple varactor LC circuits, which may be organized to cover an extended region in the body, or to cover multiple levels of radiation sensitivity, allowing for a comprehensive measurement with while reducing in the number of devices implanted in the body. The multiple varactor circuits may be spread out in the device to give spatial resolution data, or the varactors may have varying levels of sensitivity, to give data for high dose or low dose radiation treatments.

A varactor device may be calibrated prior to implantation by placing the device in a known proton, x-ray or other energetic fluence and observing the change in device's resonant frequency. This can be done in the form of a partial loading of the circuit; for example, calibrating the dose on the varactor from a level of zero to 2.0 on a varactor with a scale of 10.0. Further, after the varactor is charged by the calibration source, the charge may leak off the varactor over a time period, which may be, for example, several hours or days, resetting the varactor charge to zero prior to insertion into the body.

Figure 5:
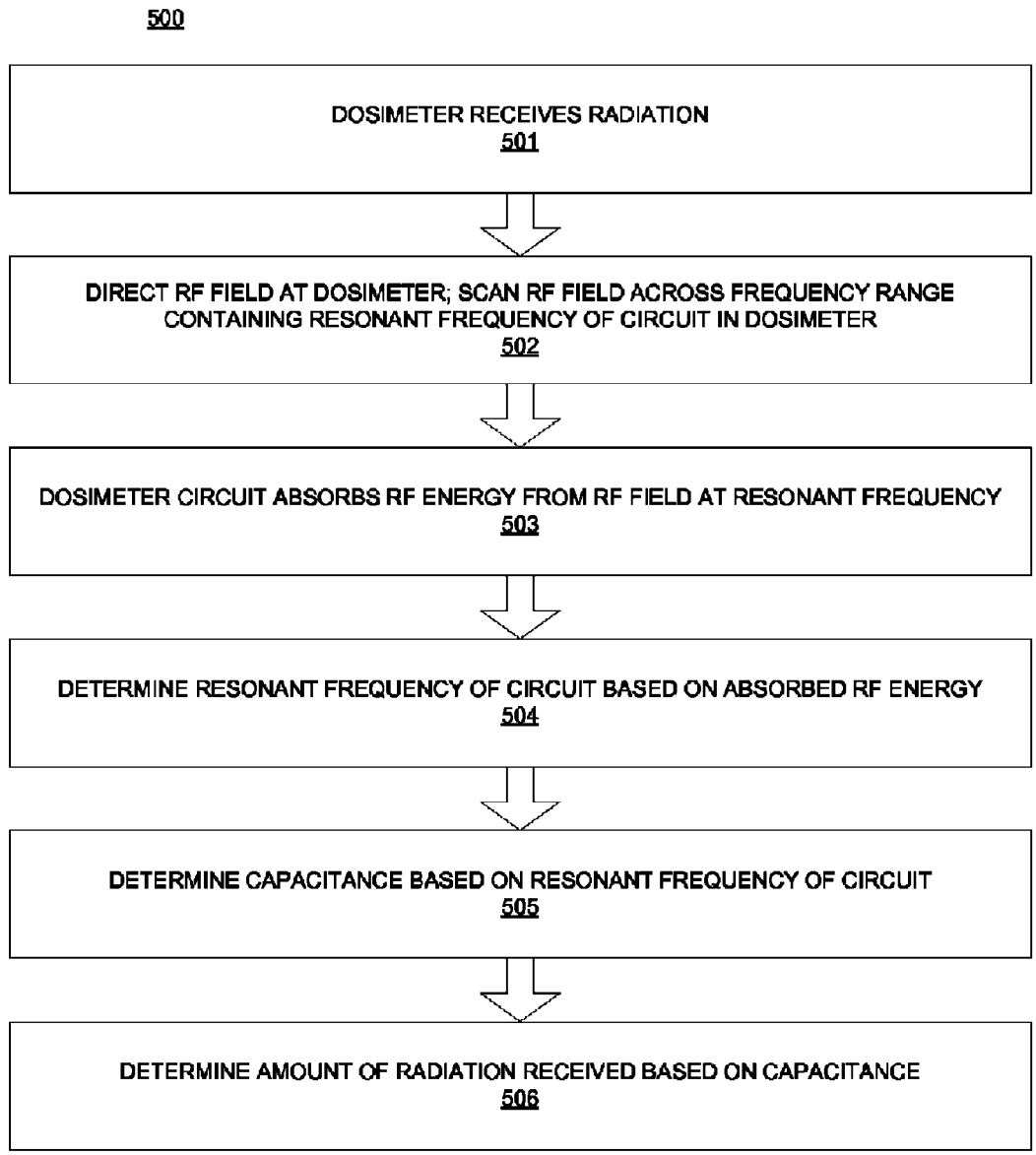
FIG. 5 illustrates an embodiment of a method of using a dosimeter powered by passive RF absorption.
Figure 6:
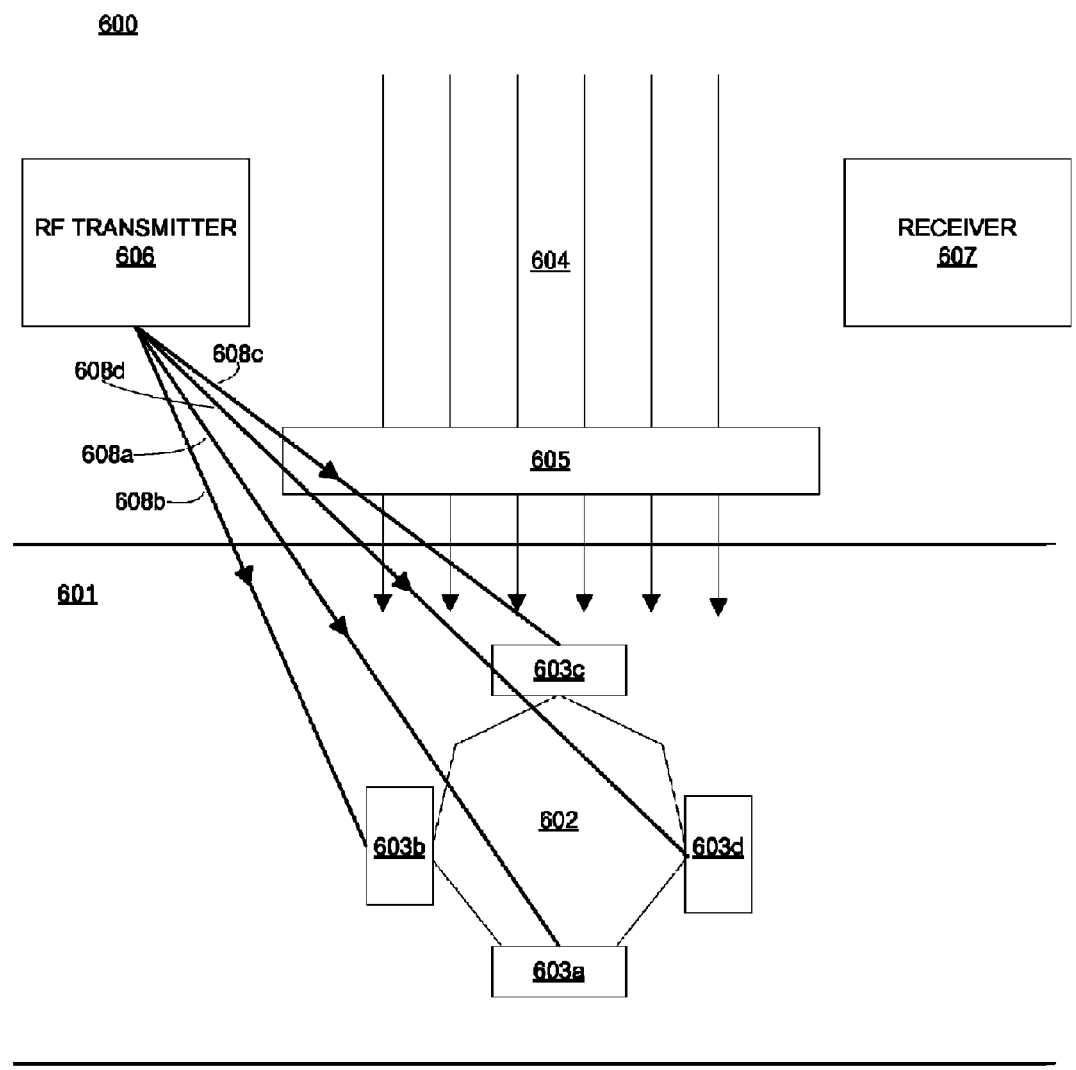
FIG. 6 illustrates a system comprising a dosimeter powered by passive RF absorption during transmission of an RF field to the dosimeter.

FIG. 5 illustrates an embodiment of a method for operating a passive dosimeter. FIG. 5 is discussed with respect to FIGS. 6 and 7. In block 501, a dosimeter comprising a circuit having an initial resonant frequency receives radiation, i.e., protons. The absorbed radiation traps a charge in the circuit varactor, reducing the capacitance of the varactor and causing a change in the resonant frequency of the circuit. As shown in FIG. 6, Dosimeters 603*a-d* are implanted in body 601 surrounding tumor 602; each of dosimeters 603*a-d* may be configured to have circuits having a different initial resonant frequency which may be used to identify each individual dosimeter, or any individual dosimeter may comprise a plurality of circuits, each circuit having a different resonant frequency. Tumor 602 and dosimeters 603*a-d* receive incident radiation 604; the received radiation (i.e., protons) results in a trapped charge in each of dosimeters 603*a-d*, causing a change in each of their respective resonant frequencies. Radiation 604 may travel through an optional external radiation detector 605 before entering body 601. Dosimeters 603*a-d* are shown for illustrative purposes only; any appropriate number and configuration of dosimeters may be used. In some embodiments, one or more dosimeters may be implanted inside a tumor.

In block 502, an RF field is directed at the dosimeter by an RF transmitter. The RF field may initially be at a frequency near the initial resonant frequency of one of the dosimeter circuit; the RF field is then scanned across a frequency range containing the resonant frequency of the one or more dosimeter circuits. As shown in FIG. 6, RF transmitter 606 transmits an RF field 608*a-d* to dosimeters 603*a-d*, respectively. In some embodiments, RF transmitter 606 may transmit at an intermediate frequency such that lock-in techniques may be utilized to enhance the signal to noise ratio. In block 503, the dosimeter circuit absorbs energy from the RF field at its LC circuit's resonant frequency via the antenna. The circuits that comprise each of dosimeters 603*a-d* absorb energy from RF field 608*a-d* at their respective resonant frequencies.

Figure 7:
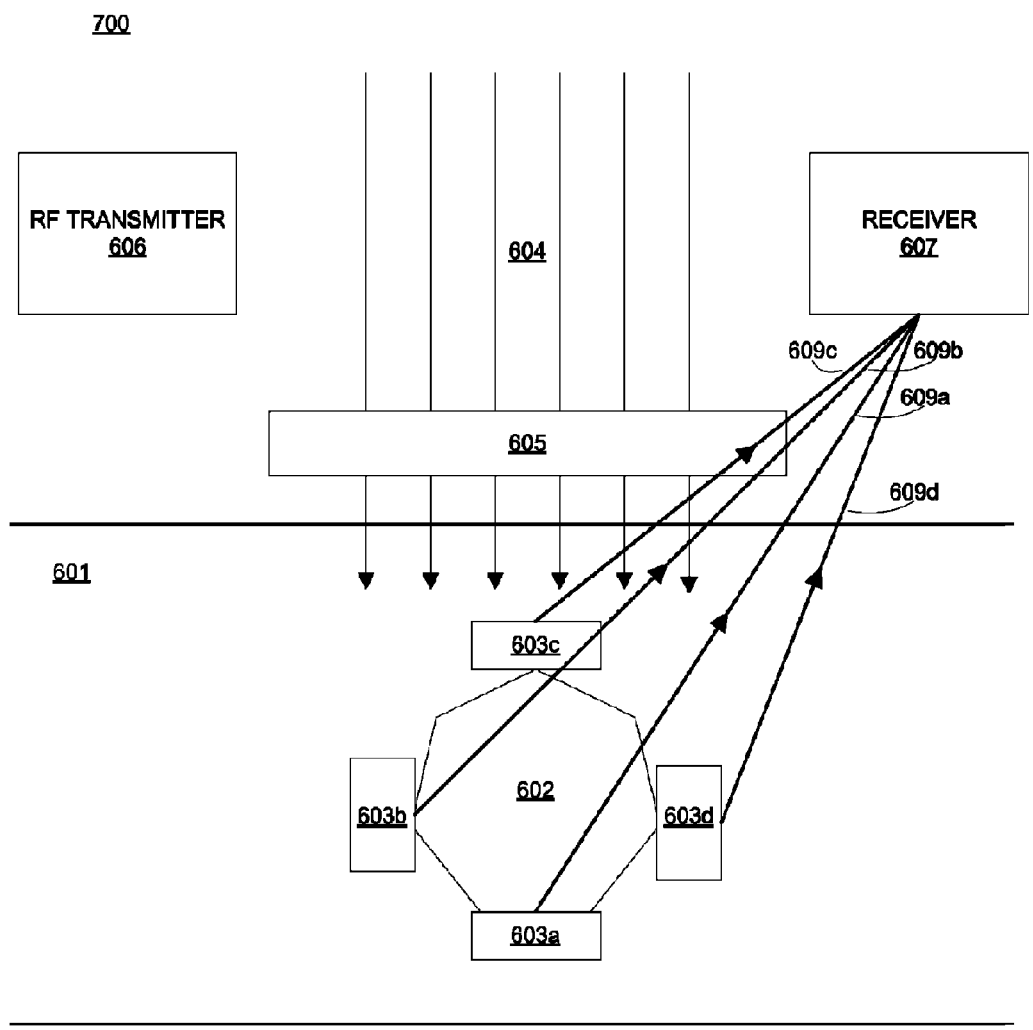
FIG. 7 illustrates a system comprising a dosimeter powered by passive RF absorption during transmitting of an oscillation by the dosimeter.

In block 504, the resonant frequency of the LC circuit that comprises the dosimeter is determined at a receiver based on the absorbed RF energy. In one embodiment, the receiver receives the transmitted RF field. Because the dosimeter absorbs energy from the RF field at the resonant frequency, the receiver may detect a dip in the energy, or signal strength, of the RF field at the resonant frequency. Detection of the dip allows for determination of the resonant frequency of the dosimeter. In another embodiment, the RF field is removed, and the resonant LC circuit that comprises the dosimeter oscillates at the resonant frequency for a time period determined by the quality factor (Q) of the circuit. The oscillation is detected at the receiver, and may be used to determine the resonant frequency. As shown in FIG. 7, the oscillation signals 609*a-d* from the circuits comprising dosimeters 603*a-d*, respectively, are received by receiver 607. Provided that the resonant frequencies of the circuits comprising dosimeters 603*a-d* are separated by a larger frequency distance than the bandwidth of their respective oscillators, oscillation signals 609*a-d* may be separately detected at receiver 607 with appropriate filtering, allowing for separate determination of each of the resonant frequencies of the circuits comprising dosimeters 603*a-d*.

In block 505, the determined resonant frequency of the circuit comprising the dosimeter is used to determine the capacitance of the varactor in the dosimeter. In block 506, the amount of radiation received by the varactor is determined from the capacitance.

The technical effects and benefits of exemplary embodiments include a reusable, implantable dosimeter that may give real-time amount and location information for a dose of radiation.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for determining an amount of radiation, the method comprising:
    receiving the amount of radiation by a dosimeter, the dosimeter comprising a circuit, the circuit having a resonant frequency that is configured to change according to the amount of radiation received by the dosimeter, wherein the circuit comprises a varactor, the varactor comprising:
        a silicon substrate; and
        a dielectric layer located on top of the silicon substrate, wherein the amount of radiation causes a corresponding negative charge to build up in the dielectric layer, and the negative charge in the dielectric layer causes a depletion region to form in the silicon substrate underneath the dielectric layer, and wherein a capacitance of the varactor is reduced in response to the formation of the depletion region;
    absorbing radiofrequency (RF) energy by the dosimeter at the resonant frequency of the circuit from an RF transmitter;
    determining the resonant frequency of the circuit based on the absorbed RF energy;
    determining the capacitance of the varactor based on the determined resonant frequency; and
    determining the amount of radiation based on the capacitance of the varactor.

2. The method of claim 1, wherein the RF energy is part of an RF field scanned across a frequency range comprising the resonant frequency.

3. The method of claim 1, wherein the circuit comprises an inductor, the varactor, and an antenna connected in series.

4. The method of claim 1, wherein the silicon substrate comprises a first silicon region and a second silicon region, the first silicon region comprising highly doped silicon and the second silicon region comprising lightly doped or undoped silicon;
    wherein the dielectric layer is located on top of the second silicon region, and the depletion region is formed in the second silicon region underneath the dielectric layer; and
    wherein the varactor further comprises a gate electrode located on top of the dielectric layer.

5. The method of claim 1, wherein the dielectric layer comprises a silicon dioxide layer located on top of the silicon substrate, and a silicon nitride layer located on top of the silicon dioxide layer;
    wherein the negative charge is built up in the silicon nitride layer, and a positive charge is built up in the silicon dioxide layer by the amount of radiation; and
    wherein the positive charge and the negative charge built up in the dielectric layer cause the depletion region to form in the silicon substrate underneath the silicon dioxide layer.

6. The method of claim 1, wherein determining the amount of radiation comprises determining a dose of protons, neutrons, alphas, ions, gamma rays or x-rays.

7. The method of claim 1, wherein determining the resonant frequency of the circuit based on the absorbed RF energy comprises determining a dip in a received strength of an RF field at the resonant frequency by a receiver.

8. The method of claim 1, wherein determining the resonant frequency of the circuit based on the absorbed RF energy comprises receiving an oscillation from the dosimeter at the resonant frequency.

9. A system for determining an amount of radiation, comprising:
    a dosimeter configured to receive the amount of radiation, the dosimeter comprising a circuit having a resonant frequency, such that the resonant frequency of the circuit changes according to the amount of radiation received by the dosimeter, the dosimeter further configured to absorb RF energy at the resonant frequency of the circuit, wherein the circuit comprises a varactor, the varactor comprising:
        a silicon substrate; and
        a dielectric layer located on top of the silicon substrate, wherein the amount of radiation causes a corresponding negative charge to build up in the dielectric layer, and the negative charge in the dielectric layer causes a depletion region to form in the silicon substrate underneath the dielectric layer, and wherein a capacitance of the varactor is reduced in response to the formation of the depletion region;
    a radiofrequency (RF) transmitter configured to transmit the RF energy at the resonant frequency to the dosimeter; and
    a receiver configured to determine the resonant frequency of the dosimeter based on the absorbed RF energy, wherein the capacitance of the varactor is determined based on the resonant frequency and the amount of radiation is determined based on the capacitance of the varactor.

10. The system of claim 9, wherein the RF energy is part of an RF field scanned across a frequency range comprising the resonant frequency.

11. The system of claim 9, wherein the circuit comprises an inductor, the varactor, and an antenna connected in series.

12. The system of claim 9, wherein the silicon substrate comprises a first silicon region and a second silicon region, the first silicon region comprising highly doped silicon and the second silicon region comprising lightly doped or undoped silicon;
    wherein the dielectric layer is located on top of the second silicon region, and the depletion region is formed in the second silicon region underneath the dielectric layer; and
    wherein the varactor further comprises a gate electrode located on top of the dielectric layer.

13. The system of claim 9, wherein the dielectric layer comprises a silicon dioxide layer located on top of the silicon substrate, and a silicon nitride layer located on top of the silicon dioxide layer;
   wherein the negative charge is built up in the silicon nitride layer, and a positive charge is built up in the silicon dioxide layer by the amount of radiation; and
   wherein the positive charge and the negative charge built up in the dielectric layer cause the depletion region to form in the silicon substrate underneath the silicon dioxide layer.

14. The system of claim 9, wherein the amount of radiation comprises a dose of protons, ions, neutrons, alphas, ions, gamma rays, or x-rays.

15. The system of claim 9, wherein the dosimeter comprises a plurality of circuits, each of the plurality of circuits having a different resonant frequency, and wherein each circuit of the plurality of circuits is identified by a receiver based on the circuit's respective resonant frequency, and wherein the identification of the plurality of circuits is used to determine respective amounts of radiation received at the respective locations of the plurality of circuits.

16. The system of claim 9, wherein the receiver is configured to determine the resonant frequency of the circuit based on the absorbed RF energy by determining a dip in a received strength of an RF field at the resonant frequency by the receiver.

17. The system of claim 9, wherein the receiver is configured to determine the resonant frequency of the circuit based on the absorbed RF energy by receiving an oscillation from the dosimeter at the resonant frequency.

18. A device for determining an amount of radiation, comprising:
   a circuit, the circuit having a resonant frequency, the circuit comprising:
      a varactor, the varactor comprising:
         a silicon substrate; and
         a dielectric layer located on top of the silicon substrate, wherein the amount of radiation causes a corresponding negative charge to build up in the dielectric layer, and the negative charge in the dielectric layer causes a depletion region to form in the silicon substrate underneath the dielectric layer, and wherein a capacitance of the varactor is reduced in response to the formation of the depletion region, and the resonant frequency changes according to the capacitance;
      an inductor in series with the varactor; and
      an antenna in series with the varactor and the inductor that is configured to absorb radiofrequency (RF) energy at the resonant frequency, such that the amount of radiation is determined based on the absorbed RF energy.

19. The device of claim 18, wherein the dielectric layer comprises a silicon dioxide layer located on top of the silicon substrate, and a silicon nitride layer located on top of the silicon dioxide layer;
   wherein the negative charge is built up in the silicon nitride layer, and a positive charge is built up in the silicon dioxide layer by the amount of radiation; and
   wherein the positive charge and the negative charge built up in the dielectric layer cause the depletion region to form in the silicon substrate underneath the silicon dioxide layer.

20. The device of claim 18, wherein the device for determining an amount of radiation comprises a plurality of circuits, each of the plurality of circuits having a different resonant frequency, and wherein each circuit of the plurality of circuits is identified by a receiver based on the circuit's respective resonant frequency, and wherein the identification of the plurality of circuits is used to determine respective amounts of radiation received at the respective locations of the plurality of circuits.

* * * * *